United States Patent [19]

Sengoku

[11] Patent Number: 4,748,497
[45] Date of Patent: May 31, 1988

[54] TELEVISION RECEIVER AUTOMATIC COLOR TEMPERATURE ADJUSTING SYSTEM WITH START UP CONTROL

[75] Inventor: Yoshinari Sengoku, Kanagawa, Japan

[73] Assignee: Sony Corporation, Tokyo, Japan

[21] Appl. No.: 47,405

[22] Filed: May 6, 1987

[30] Foreign Application Priority Data

May 16, 1986 [JP] Japan ................................. 61-110675

[51] Int. Cl.⁴ .......................... H04N 9/73; H04N 9/16
[52] U.S. Cl. .......................................... 358/29; 358/65;
358/74; 358/243
[58] Field of Search ...................... 358/29, 65, 74, 242, 358/243

[56] References Cited

U.S. PATENT DOCUMENTS

| | | | |
|---|---|---|---|
| 4,340,904 | 7/1982 | Wingrove | 358/29 |
| 4,342,048 | 7/1982 | Falater et al. | 358/29 |
| 4,450,476 | 5/1984 | Tallant, II | 358/243 |
| 4,506,292 | 3/1985 | Newton et al. | 358/10 |
| 4,587,566 | 5/1986 | Hinn | 358/29 |
| 4,660,093 | 4/1987 | Craig et al. | 358/74 |
| 4,692,793 | 9/1987 | Tamura et al. | 358/29 |

Primary Examiner—John W. Shepperd
Attorney, Agent, or Firm—Philip M. Shaw, Jr.

[57] ABSTRACT

An automatic color temperature adjusting system for a television receiver which is capable of eliminating an unstable picture condition during the turn on transition period. The automatic color temperature adjusting system has a gain control circuit associated with a feedback loop for controlling the amplifier characteristics of an amplifier in each color channel. The gain control circuit is responsive to the turning on of the power supply to lower the gain of each amplifier to a given level. The gain control circuit adjusts the gain of the amplifier to gradually increase the gain to reach a normal gain level after a given period of time.

13 Claims, 4 Drawing Sheets

TELEVISION RECEIVER AUTOMATIC COLOR TEMPERATURE ADJUSTING SYSTEM WITH START UP CONTROL

BACKGROUND OF THE INVENTION

1. Technical Field of the Invention

The present invention relates generally to a color temperature automatic adjusting system for a color television receiver. More specifically, the invention relates to an automatic white balance adjusting system which can eliminate unstable pictures in the transition period after turning on the power switch of the color television receiver.

2. Background Art

Television receivers contain automatic white balance circuits of the type disclosed in published European patent application No. 0 192 413 (corresponding to U.S. application Ser. No. 826,025, filed Feb. 4, 1986). Such circuits monitor the cathode beam currents for the cathode ray tube and adjust the gains of the primary color signal circuits accordingly to maintain a white balance.

A problem arises, however, when the television receivers are first switched on. Since the heater for the cathode electrode of the display tube is cold when the television receiver is turned on, the primary color signal circuits are controlled so as to be in a condition to cause the cathode beam currents to flow at a maximum value. Thus, when the heater is heated sufficiently, and the cathode emission begins, the video screen becomes too bright during a transient time until the auto white balance circuit becomes stabilized. Also, since the cut-off voltage EKCO of the display tube is scattered between the red color, the green color and the blue color cathodes, the auto white balance circuit will be stabilized after different times for red, green and blue, and the color of the picture will fluctuate.

The Japanese Patent First Publication (Tokkai) No. Showa 55-67286 discloses a white balance adjusting apparatus which attempts to overcome this problem. In the disclosed system, the automatic control loop is cut-off and a white balance adjusting voltage is supplied from a predetermined bias source upon turning on the power supply for a television receiver. The cutoff condition of the automatic control loop is maintained for a predetermined period of time after turning on the power supply. Upon expiration of the predetermined period, the power supply for the automatic adjusting loop is resumed. Therefore, the automatic adjusting loop becomes operative after a given delay time corresponding to the aforementioned predetermined period after turning on the power supply. Then, automatic white balance adjustment takes place by means of the automatic control loop.

However, since the picture is immediately displayed in response to turning on the power supply for the television receiver, an unadjusted picture becomes visible while the automatic adjusting loop is held inoperative. Furthermore, even after resumption of the operation of the automatic control loop, the picture condition becomes unstable during the transition period while the white balance adjustment takes place. Therefore, in the system disclosed in the Tokkai Showa 55-67286, it is inevitable that an unstable picture condition occurs during the turn on transition period.

DISCLOSURE OF THE INVENTION

Therefore, it is an object of the present invention to provide an automatic color temperature adjusting system which can eliminate the unstable picture condition during the turn on transition period.

In order to accomplish the aforementioned and other objects, an automatic color temperature adjusting system, according to the present invention, is comprised of a gain control circuit associated with a feedback loop for controlling the gain characteristics of an amplifier in each color channel. The gain control circuit, in response to the turning on of the power supply, lowers the gain at each amplifier to a given level. The gain control circuit adjusts the gain at each amplifier to gradually increase the gain to reach a normal gain level after a given period of time.

In practice, the given period of time during which it is necessary to maintain the gain of each amplifier at a lower than normal level is chosen to be long enough to sufficiently heat the color picture tube cathode of the color channel associated with that amplifier for normalizing cathode emission. During this turn on transition period, the gain at each amplifier is increased corresponding to the increase in emission of the corresponding cathode. As a result, the unstable picture condition during the turn on transition becomes invisible so that there is a smooth transition to a stable picture display.

According to one aspect of the invention, an automatic color temperature adjusting system for a color television receiver having a color picture tube which includes a plurality of cathodes to be respectively driven by different corresponding color channel primary color signals, comprises means, including a plurality of primary color signal channels, for supplying respective channels of primary color signals to the corresponding cathodes in the picture tube, means, disposed in each of the primary color signal channels, for amplifying the corresponding channel of the primary color signal at a controlled level, and means for feedback controlling the amplifying characteristics of each amplifying means so as to adjust the cathode beam current of the white level at an optimal level, the feedback controlling means being responsive to a turning on of the power supply to adjust the amplifying characteristics of the amplifying means to set the cathode beam current at a predetermined minimum level and subsequently, gradually increasing the cathode beam current to a normal level in a given period of time.

In the practical construction, the gain of the amplifying means is variable inversely with respect to a control voltage applied thereto from the feedback controlling means, and the feedback control means includes a transition control signal generator which is active during the turn on transition period for initially setting the control voltage at a predetermined maximum level and gradually decreasing the level toward a normal level within the turn on transition period.

The feedback control means adjusts the gain of the amplifying means to increase the cathode beam current according to the increase in emissions of the cathode. In order to adjust the gain of the amplifying means, it is preferred to construct the feedback controlling means to include an error signal generator means for comparing a voltage representative of the cathode beam current with a predetermined reference voltage to derive a difference therebetween and producing an error signal indicative of the difference. The feedback controlling means may further comprise a sample and hold circuit to sample and hold the error signal to produce the control voltage based on the held error signal level. The sample and hold circuit operates during a white level blanking period to sample the error signals and holds the error signal level to output a constant control voltage upon termination of the white level blanking period.

In practice, the automatic color temperature adjusting system further comprises means, active during the white level blanking period, for adding a predetermined white level reference signal to the corresponding channel of the primary color signal.

According to one embodiment, the transition control signal generator is associated with the sample and hold circuit to supply a transition control signal in order to initially raise the output of the sample and hold circuit to a maximum level in response to the turn on of the power supply and, subsequently, gradually decrease the level of the transition control signal to decrease the output level toward the normal level within the turn on transition period. In an alternative embodiment, the transition control signal generator is associated with the error signal generator means to supply a transition control signal to the latter for adjusting the input voltage signal to a maximum level in response to the turning on of the power supply and, subsequently, gradually decrease the input level toward the normal level within the turn on transition period. Furthermore, the transition control signal generator includes a time constant circuit which provides a predetermined delay time for lowering the signal level of the transition control signal to a zero level after turning off of the power supply so that the transition control signal will resume at the level existing when the power was turned off.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for explanation and understanding only.

In the drawings.

BEST MODE FOR CARRYING OUT THE INVENTION

Figure 1:
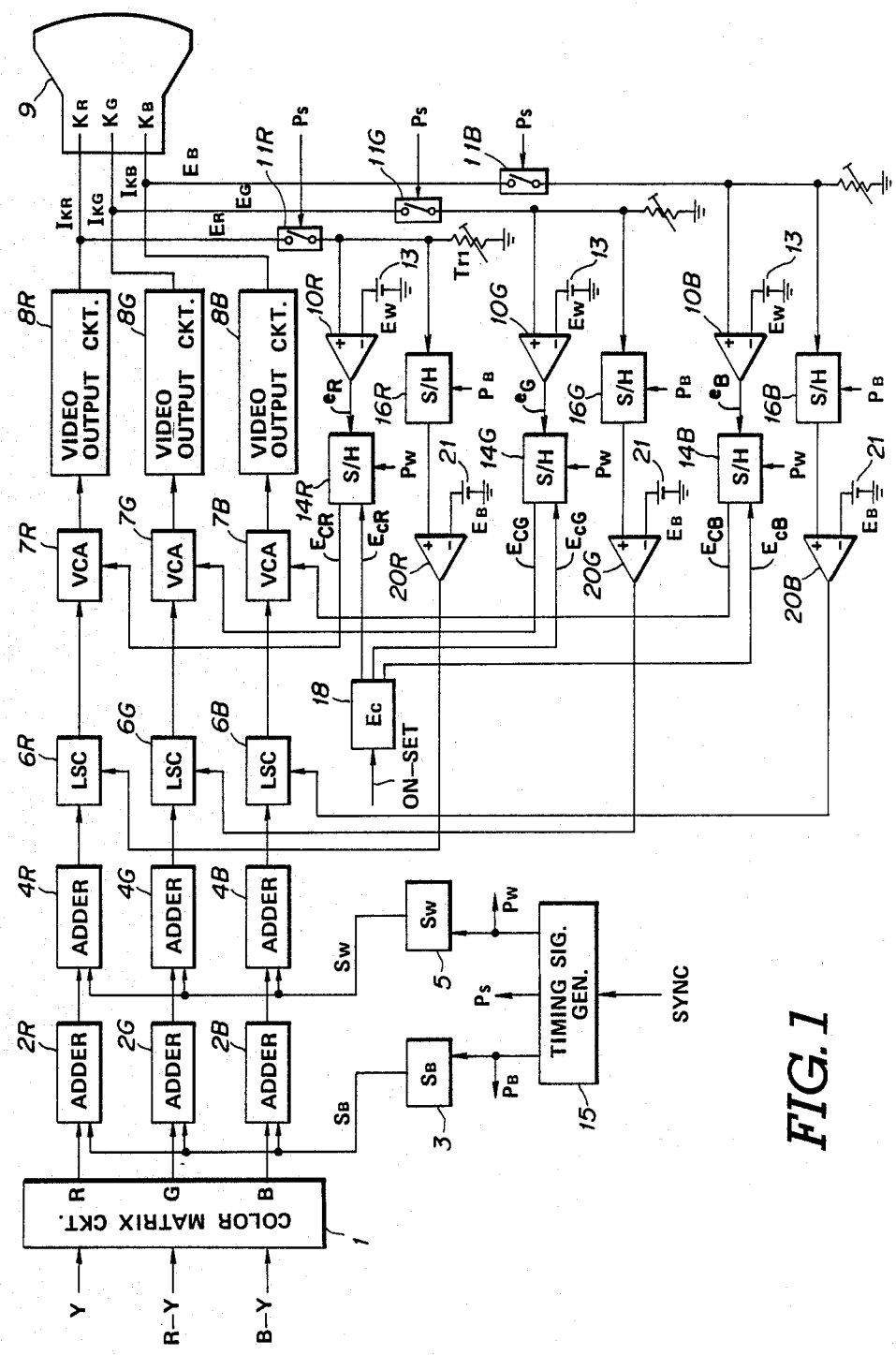
FIG. 1 is a block diagram of the preferred embodiment of an automatic color temperature adjusting system according to the invention.

Referring now to the drawings, particularly to FIG. 1, the preferred embodiment of an automatic color temperature adjusting system, according to the invention, is provided in a color television circuit which has a color matrix circuit 1. The color matrix circuit 1 is connected to a composite video signal source (not shown). As is well known, the typical composite video signal source comprises a television tuner circuit, a video detector, a luminance signal/chrominance signal separator circuit, a luminance amplifier and a color demodulator, for example. The tuner circuit receives a video signal through an antenna input terminal, for example. The video detector circuit receives an amplified intermediate frequency signal from the tuner circuit to output the composite video signal. The luminance signal/chrominance signal separator circuit separates luminance signal Y and the chrominance signal. The luminance signal output from the luminance signal/chrominance signal separator circuit is fed to the color matrix circuit 1 through a luminance amplifier. The chrominance signal is input to the color demodulator circuit. The color demodulator circuit produces a red color difference signal R-Y and a blue color difference signal B-Y based on the input chrominance signal. These color difference signals R-Y and B-Y are also input to the color matrix circuit 1. The color matrix circuit 1 performs a matrix resolution of the luminance signal Y and the color difference signals R-Y and B-Y to produce red, green and blue primary color signals R, G and B.

The red, green and blue primary color signals R, G and B are supplied to adders 2R, 2G and 2B, respectively. The adders 2R, 2G and 2B are connected to a black level reference signal generator circuit 3 which produces a black level reference signal $S_B$. The adders 2R, 2G and 2B add the black level reference signal $S_B$ to respective red, green and blue primary color signals R, G and B. The outputs of the adders 2R, 2G and 2B are fed to adders 4R, 4G and 4B, respectively, which are, in turn, connected to a white level reference signal generator 5. The white level reference signal generator 5 produces a white level reference signal $S_W$. The adders 4R, 4G and 4B add the white level reference signal $S_W$ to the respective inputs from the associated adders 2R, 2G and 2B.

The outputs of the adders 4R, 4G and 4B are input, respectively, to level shifter circuits 6R, 6G and 6B. The level shifter circuits 6R, 6G and 6B are active during the blanking period at a controlled timing. The level shifter circuits 6R, 6G and 6B have variable gains to adjust the beam current of the black level. The outputs of the level shifter circuits 6R, 6G and 6B are input to voltage controlled amplifiers 7R, 7G and 7B, respectively, which also have variable gains. The voltage controlled amplifiers 7R, 7G and 7B are connected to video output circuits 8R, 8G and 8B, respectively, which include amplifiers. The video output circuits 8R, 8G and 8B are connected, respectively, to an associated red cathode $K_R$, an associated green cathode $K_G$ and an associated blue cathode $K_B$ of color picture tube 9. The video output circuits 8R, 8G and 8B generate variable cathode beam currents $I_{KR}$, $I_{KG}$ and $I_{KB}$, respectively, to be applied to the associated cathodes $K_R$, $K_G$ and $K_B$, respectively, depending upon the gains at the voltage controlled amplifiers 7R, 7G and 7B, respectively.

The video output circuits 8R, 8G and 8B are also connected to one input terminal of differential amplifiers 10R, 10G and 10B, respectively, and sample and hold circuits 16R, 16G and 16B, respectively, via switching circuits 11R, 11G and 11B, respectively. The switch circuits 11R, 11G and 11B are connected to a timing signal generator circuit 15 to receive therefrom a sampling pulse $P_S$ to cause voltage signals $E_R$, $E_G$ and $E_B$, having voltages respectively corresponding to the current values of the cathode beam currents $I_{KR}$, $I_{KG}$ and $I_{KB}$, to be supplied to the inputs of the respective amplifiers 10R, 10G, and 10B while the sampling pulse is present. The timing signal generator circuit 15 generates the sampling pulse at a controlled timing which is derived on the basis of the synchronization signals.

The other inputs of the operational amplifiers 10R, 10B and 10C are connected to a reference voltage source 13 to receive therefrom a reference voltage $E_W$. The operational amplifiers 10R, 10G and 10B produce error signals $e_R$, $e_G$ and $e_B$, respectively. The error signals $e_R$, $e_G$ and $e_B$ are fed to the sample and hold circuits 14R, 14G and 14B, respectively. The sample and hold circuits 14R, 14G and 14B are connected to the timing signal generator 15 to receive therefrom sampling pulses $P_W$. Namely, the sample and hold circuits 14R, 14G and 14B sample the error signals $e_R$, $e_G$ and $e_B$, respectively, in response to the sampling pulse $P_W$ from the timing signal generator 15 and hold the error signal values while the sampling pulses are absent.

The sample and hold operations of the sample and hold circuits 16R, 16G and 16B are controlled by a sampling pulse $P_B$ input from the timing signal generator 15. Namely, the sample and hold circuits 16R, 16G and 16B sample the values of the voltage signals $E_R$, $E_G$ and $E_B$, respectively, which are indicative of the current values of the beam currents $I_{KR}$, $I_{KG}$ and $I_{KB}$, respectively, in response to the sampling pulses $P_B$ from the timing signal generator 15 and hold the sampled beam current values while the sampling pulses $P_W$ are absent.

The sample and hold circuits 14R, 14G and 14B are connected to the voltage controlled amplifiers 7R, 7G and 7B, respectively, to feed them the control voltages $E_{CR}$, $E_{CG}$ and $E_{CB}$ indicative of the held error signal values $e_R$, $e_G$ and $e_B$, respectively. A transition control voltage generator 18, in response to the turning on of the power supply to the television receiver, outputs separate initial control voltages $E_{cR}$, $E_{cG}$ and $E_{cB}$ which are added to the outputs of the sample and hold circuits 14R, 14G and 14B, respectively, and the sums are supplied to the voltage controlled amplifiers 7R, 7G and 7B, respectively, as will be explained in greater detail further in this description. The gain of the voltage controlled amplifiers are varied in the opposite direction of the variation of the control voltage signals supplied thereto. These voltage signals $E_{cR}$, $E_{cG}$ and $E_{cB}$ are inversely indicative of the cathode beam current levels to be held during turn on.

As will be appreciated, the voltage controlled amplifiers 7R, 7G and 7G, the video output circuits 8R, 8G and 8B, the operational amplifiers 10R, 10G and 10B and the sample and hold circuits 14R, 14G and 14B form feedback loops for controlling the gain of the voltage controlled amplifiers.

The sample and hold circuits 16R, 16G and 16B sample the voltages of the voltage signals $E_R$, $E_G$ and $E_B$, respectively, in response to the sampling pulse $P_B$ from the timing signal generator 15. The sample and hold circuits 16R, 16G and 16B hold the voltage signal values $E_R$, $E_G$ and $E_B$, respectively, and output the held values to respectively associated operational amplifiers 20R, 20G and 20B. The operational amplifiers 20R, 20G and 20B also receive a reference voltage $E_B$ from a reference voltage source 21. The operational amplifiers 20R, 20G and 20B produce error signals representative of the differences between the voltage signal values $E_R$, $E_G$ and $E_B$, respectively, and the reference voltage $E_B$. The error signals produced by the operational amplifiers 20R, 20G and 20B serve as control voltages for the black level setting circuits 6R, 6G and 6B, respectively, for controlling the gain thereof.

The timing signal generator 15 is connected to the black level reference signal generator circuit 3, the white level reference signal generator circuit 5, and the sample and hold circuits 14R, 14G, 14B and 16R, 16G, 16B for supplying the timing pulses $P_W$ and $P_B$. In order to produce the timing pulses $P_W$ and $P_B$, the timing signal generator 15 receives synchronization signals, i.e., vertical synchronization signals and horizontal synchronization signals. The timing pulse generator 15 is responsive to the vertical synchronization signal reproduced at the end of the vertical blanking period to produce the timing signal $P_W$ for one horizontal scanning period. For the next one horizontal scanning period, the timing signal $P_B$ is produced by the timing signal generator 15.

The aforementioned circuit performs white balance adjustment by adjusting the gain of the voltage controlled amplifiers 7R, 7G and 7B at the timing controlled by the timing signals $P_W$ and $P_B$. The details of the gain control system for the voltage controlled amplifiers 7R, 7G and 7B and the operation thereof will now be described with reference to FIGS. 2 to 6.

Figure 2:
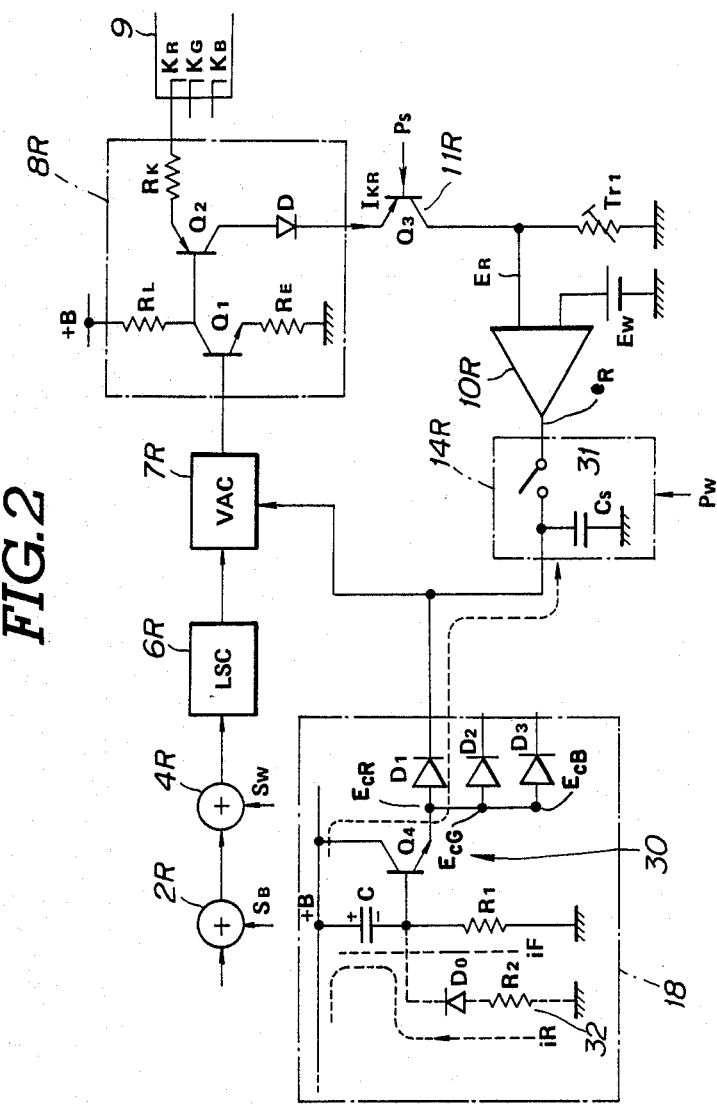
FIG. 2 is a block diagram of a white level adjusting feedback system in the preferred embodiment of the automatic color temperature adjusting system of FIG. 1.

It should be appreciated that, since the feedback systems for controlling the gains of the voltage controlled amplifiers 7R, 7G and 7B are of identical construction, the detailed circuit construction of only the red channel feedback system is illustrated in FIG. 2.

As seen from FIG. 2, the video output circuit 8R includes an npn-type transistor $Q_1$. The base electrode of the transistor $Q_1$ is connected to the output of the voltage controlled amplifier 7R to receive the red channel primary color signal R from the voltage controlled amplifier 7R. The emitter electrode of the transistor $Q_1$ is grounded via a resistor $R_E$. The collector electrode of the transistor $Q_1$ is connected to a power supply terminal $+B$ via a resistor $R_L$. The collector electrode of the npn-type transistor $Q_1$ is also connected to the base electrode of a pnp-type transistor $Q_2$. The emitter electrode of the transistor $Q_2$ is connected to the cathode $K_R$ that provides the red color gun of the color picture tube 9. The collector electrode of the transistor $Q_2$ is connected to the circuit ground via a series circuit comprised of a diode D, the pnp-type switching transistor $Q_3$ (which constitutes the switch 11R), and a variable resistor $T_{r1}$.

The control voltage generator 18 comprises a time constant circuit 30 constituted by a capacitor C connected in series with a resistor $R_1$ between the power supply terminal $+B$ and the circuit ground, an npn-type transistor $Q_4$, and diodes $D_1$, $D_2$ and $D_3$. The transistor $Q_4$ employed in the shown embodiment constitutes an emitter follower. The base electrode of the transistor $Q_4$ is connected to the junction of the capacitor C and the resistor $R_1$. The cathode electrodes of the diodes $D_1$, $D_2$ and $D_3$ are respectively connected to the sample and hold circuits 14R, 14G and 14B. The anodes of the diodes $D_1$, $D_2$ and $D_3$ are connected to the emitter electrode of the transistor $Q_4$.

As shown in FIG. 2, each sample and hold circuit 14R, 14G and 14B comprises an on/off switch 31 whose switch contact position is controlled by the timing signal $P_W$ of the timing signal generator circuit 15, which serves as the sampling pulse. Each of the sample and hold circuits 14R, 14G and 14B further comprises a capacitor $C_S$ to be charged by the error signal output from the associated operational amplifier 10R, 10G and 10B. In the example of FIG. 2, the switch 31 is turned on in response to the timing pulse $P_W$ and held at the on position for the period while the timing pulse $P_W$ is held at the HIGH level. During this period, the capacitor $C_S$ is charged by the error signal $e_R$ from the operational amplifier 10R. When the timing pulse $P_W$ changes to a LOW level, the switch 31 is opened to disconnect the capacitor $C_S$ from the operational amplifier 10R. Therefore, the error signal $e_R$ charged to the capacitor $C_S$ during the period of the timing pulse $P_W$ is supplied to the voltage controlled amplifier 7R until the next timing pulse $P_W$ turns on the switch 31.

In the preferred construction, a discharge circuit 32, including a diode $D_0$ in series with a resistor $R_2$, may be connected in parallel with the resistor $R_1$ in the transition control voltage generator circuit 18, as illustrated by the phantom line in FIG. 2. In this case, the resistance of the resistor $R_2$ may be selected in relation to the capacity of the capacitor C so that the discharge characteristics of the discharge circuit may approximately correspond to the heat discharging characteristics of the cathode $K_R$.

In the circuit arrangement as set forth above, the cathodes $K_R$, $K_G$ and $K_B$ of the picture tube 9 are driven by the red, green and blue primary color signals R, G and B, respectively, to display color picture on the video screen of the picture tube in the usual fashion. The customary deflection circuits are not shown since they form no part of the invention.

Figure 3:
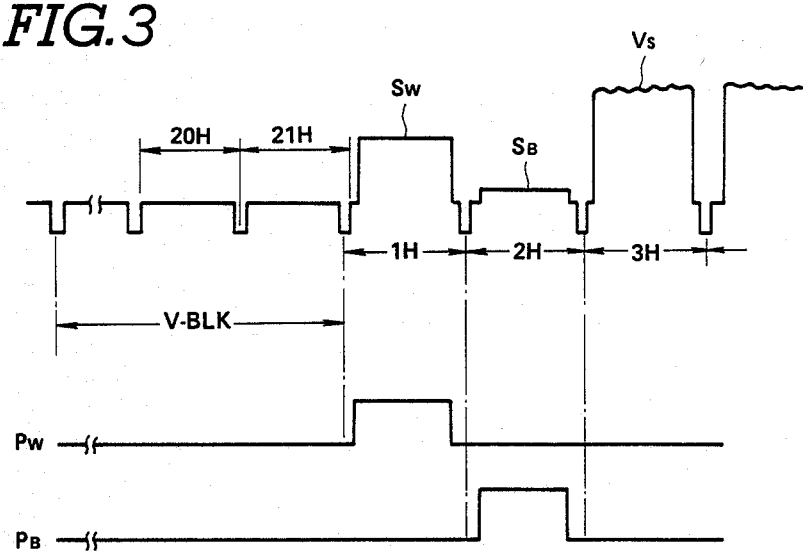
FIG. 3 is a chart showing the timing of the blanking period, in which color temperature adjustment is performed, in relation to the color video signal.

Referring again to FIG. 1, the timing signal generator 15 receives the vertical and horizontal synchronization signals to produce horizontal blanking pulses, after a vertical blanking period of 5 to 6 horizontal scanning periods. As shown in FIG. 3, the horizontal blanking pulses generated by the timing signal generator 15 serve as respective timing pulses $P_W$ and $P_B$. Namely, throughout the first horizontal scanning period immediately after termination of the vertical blanking period, the timing pulse $P_W$ is produced and maintained at a HIGH level. The timing pulse $P_B$ is produced and maintained at a HIGH level for the second horizontal scanning period. The timing pulse $P_W$ is supplied to the white level reference signal generator circuit 5. Therefore, the white level reference signal generator circuit 5 becomes active in the first horizontal scanning period to output the white level reference signal $S_W$ having a luminance level in a range of 50–60 IRE. In the second horizontal scanning period, the timing pulse $P_B$ is supplied to the black level reference signal generator circuit 3 to activate the latter. The black level reference signal generator 3 thus becomes active to output the black level reference signal $S_B$ having a luminance level of 5 IRE.

It should be appreciated that, during the aforementioned blanking period, the video output circuits 8R, 8G and 8B are held nonconductive to the red, green and blue primary color signals R, G and B, respectively, in a per se well known manner, as for example, shown in published European patent application No. 0 192 413. Therefore, flyback lines are prevented from appearing on the video screen.

The timing signal generator 15 also outputs a timing signal $P_S$ which is held at a HIGH level throughout the blanking period. The timing signal $P_S$ is supplied to the switching circuit 11R which corresponds to the transistor $Q_3$ in FIG. 2. A HIGH level timing pulse $P_S$, causes the switching circuit 11R (as well as the other switches 11G and 11B) to become conductive to feed the voltage signals $E_R$, $E_G$ and $E_B$, respectively, to the operational amplifiers 10R, 10G and 10B, respectively, of the white balance feedback control systems of the respective color channels, and to the sample and hold circuits 16R, 16G and 16B, respectively, of the black level feedback control systems of respective color channels.

The timing pulse $P_B$ is also supplied to the sample and hold circuits 16R, 16G and 16B to place them in the sample mode. While the timing pulse $P_B$ is held at the HIGH level, the sample and hold circuits 16R, 16G and 16B sample the voltage signals $E_R$, $E_G$ and $E_B$, respectively. The sample and hold circuits 16R, 16G and 16B, in response to the termination of the HIGH level timing signal $P_B$, hold the voltage signal values $E_R$, $E_G$ and $E_B$, respectively, and output them as constant voltage signals. The operational amplifiers 20R, 20G and 20B, respectively, compare these voltage signals with the reference voltage $E_B$ to produce error signals. The error signals are fed back to the level shifter circuits 6R, 6G and 6B to adjust the black level for respective color channel primary color signals.

As set forth above, since the timing signal $P_B$ is generated during the second horizontal scanning period, the aforementioned black level adjustment takes place during the second horizontal scanning period.

The white level adjustment takes place during the first horizontal scanning period in response to the timing pulse $P_W$. In the white level adjustment, the operational amplifier 10R compares the voltage signal $E_R$, supplied from the switching transistor $Q_3$, with the reference voltage $E_W$ to output the error signal $e_R$. The sample and hold circuit 14R samples the error signal value $e_R$ while the HIGH level timing signal $P_W$ is supplied. The sample and hold circuit 14R holds the sampled error signal value $e_R$ in response to termination of the timing signal $P_W$ and outputs a constant voltage control signal $E_{CR}$ to the voltage controlled amplifier 7R. Referring again to FIG. 2, the operation of the auto white balance circuit during turn on will now be explained.

Figure 4A:
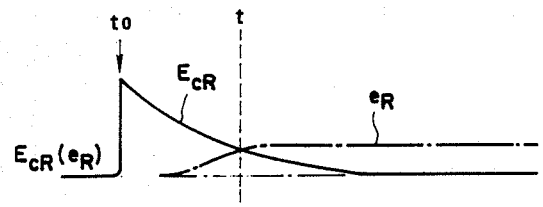
FIGS. 4(A) and 4(B) are charts showing variations of the transition control voltage, the voltage corresponding to the cathode beam current and the gain of the voltage controlled amplifier employed in the preferred embodiment of the automatic color temperature adjusting system.
Figure 5:
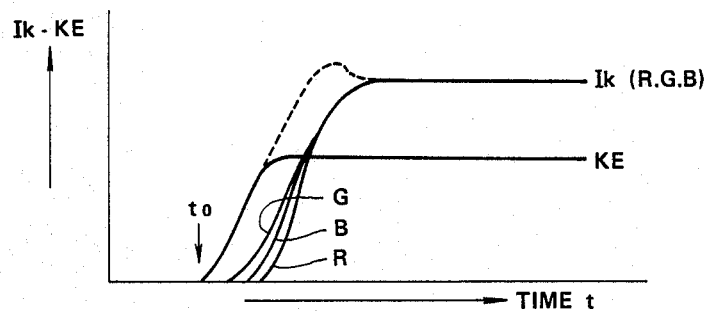
FIG. 5 is graph showing variations of the cathode beam current and the cathode emission.

When the power supply is turned on at a time $t_0$, the cathode emission KE and the cathode beam current $I_{KR}$ increase as illustrated in FIG. 5. The capacitor C is also charged rapidly. As a result, the voltage applied to the base electrode of the transistor $Q_4$ increases quickly to turn the transistor on. Immediately after being fully charged, the capacitor C starts discharging. The discharge voltage of the capacitor C is supplied through the now conductive transistor $Q_4$ to the capacitor $C_S$ of the sample and hold circuit 14R, as the initial control voltage $E_{cR}$. At this time, the initial control voltage $E_{cR}$ has momentarily risen to the maximum level, and then gradually decreases according to the time constant of a time constant circuit 30 as shown in FIG. 4A. On the other hand, during the transition which the cathode emission KE gradually increases, the amplitude of the error signal according to the increase of the cathode beam current IKR as shown in FIG. 4A.

While the amplitude of the initial control voltage $E_{cR}$ is bigger than the amplitude of the error signal $e_R$, the diode $D_1$ is conductive and so the initial control voltage $E_{cR}$ is supplied to the voltage controlled amplifier 7R.

At a time t, as the amplitude of the error signal $e_R$ becomes bigger than the initial control voltage $E_{cR}$, the diode $D_1$ becomes non-conductive and then the error signal $e_R$ is supplied to the voltage controlled amplifier 7R instead of the initial control voltage $E_{cR}$.

Figure 4B:
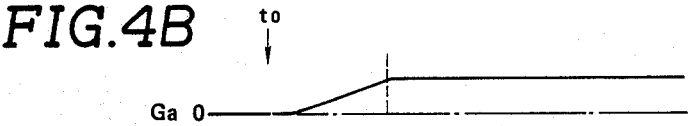

Accordingly, the gain Ga of the voltage controlled amplifier 7R varies in accordance with the control voltages $E_{cR}$ or $e_R$ as shown in FIG. 4B.

Figure 6:
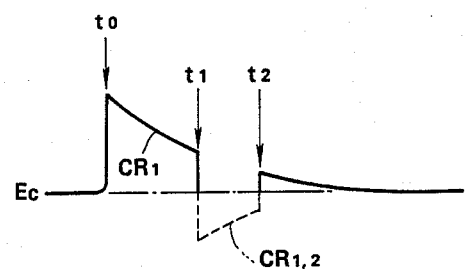
FIG. 6 is a chart showing the variation of the transition control voltage to be produced in the preferred embodiment of the automatic color temperature adjusting system when the power supply is switched on, off, and on again within a short period.

As shown in FIG. 6, when the power supply is once turned on at a time $t_0$, off at a time $t_1$ after a substantially short period after the time $t_0$, and again turned on at a time $t_2$ after a substantially short period from the time $t_1$, the discharge circuit 32 in the transition control voltage generator 18 serves to vary the initial control voltage as shown. Namely, since the discharge circuit 32 has a time constant determined by the resistance of the resistor $R_2$ and the capacity of the capacitor C, which substantially corresponds to the heat discharge characteristics of the cathode, the capacitor C is held at a charged condition even after turning off the power supply. Therefore, when the power supply is again turned on at the time $t_2$, the discharge of the capacitor C is resumed from the level existing when the power was turned off. Therefore, even when the power switch is operated to turn on, off and on again within a short period, smooth transition can be provided.

Figure 7:
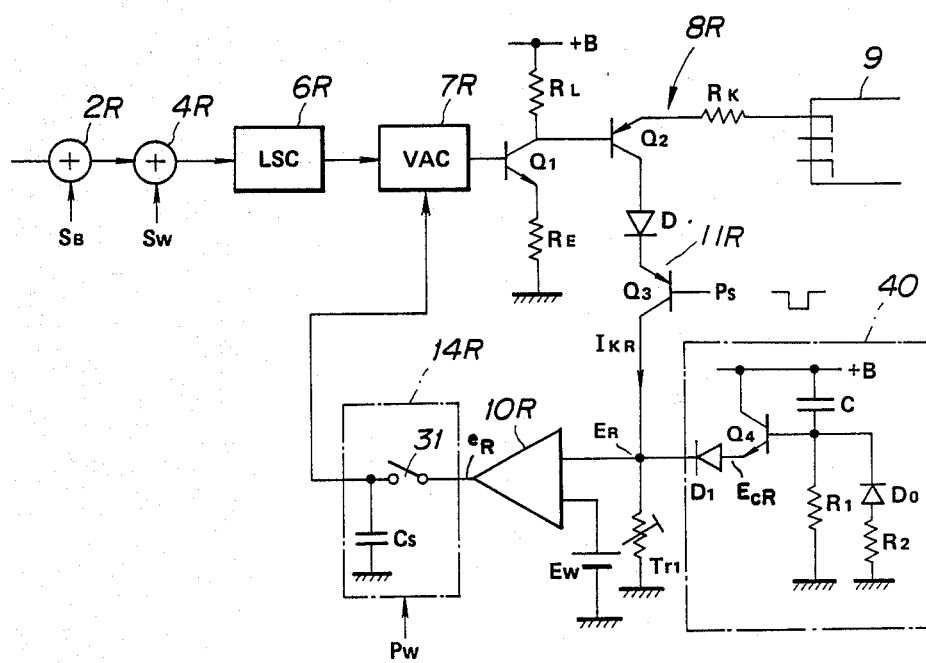
FIG. 7 is a block diagram similar to FIG. 2 but showing another embodiment of the automatic color temperature adjusting system according to the invention.

FIG. 7 shows another embodiment of the white balance adjusting feedback system. In this embodiment, a transition control circuit 40, similar in construction to the transition control voltage generator 18 and therefore supplied with the same reference numerals, is connected between the switching transistor $Q_3$ and the operational amplifier 10R. The transition control circuit 40 is designed to raise the voltage signal $E_{CR}$ to be applied to the operational amplifier 10R to the maximum level in response to turning on the power supply. In a manner similar to that described above for the transition control voltage generator 18, the transition control circuit 40 operates to gradually decrease the voltage signal level $E_{CR}$ to the normal level in a predetermined period of time.

As set forth with respect to the former embodiment, the voltage of the voltage signal $E_R$ increases as the cathode emission increases and thus as the cathode beam current increases. When the power is turned on, the capacitor C immediately charges and the transistor $Q_4$ turns on to apply the voltage charge on the capacitor C to the input to the amplifier 10R. As the capacitor C discharges and the initial control $E_{cR}$ is decreasing, the voltage $E_R$ increases. Therefore, when the initial control voltage is bigger than the voltage $E_R$, the initial control voltage is supplied to the operational amplifier 10R, because the diode $D_1$ is conductive. On the other hand, when the voltage becomes bigger than the initial control voltage $E_{cR}$, the voltage $E_R$ is supplied to the operational amplifier, because the diode $D_1$ is not conductive. Similarly to the former embodiment, smooth turn on transition can thereby be provided.

While various switches have been shown and described in terms of mechanical switches, it will be understood that in the actual embodiments such switches are electronic switches.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principles of the invention set out in the appended claims.

What is claimed is:

1. An improved automatic color temperature adjusting system for a color television receiver of the type having a color picture tube which includes a power supply, an on/off switch for said power supply, and a plurality of cathodes each of whose beam currents are controlled by a different one of a plurality of corresponding primary color signals, and wherein the automatic color temperature adjusting system is of the type which includes for each cathode:
   means for amplifying the corresponding primary color signal at a level controlled by a gain control signal;
   means for supplying the amplified primary color signal to the corresponding cathode in said picture tube to thereby control the beam current of said cathode; and
   means for feedback controlling the gain of said amplifying means so as to thereby adjust the cathode beam current of the white level at an optimal level, and
   wherein the improvement comprises a transition control signal generator within said feedback controlling means, which is responsive to a turning on of the power supply, for generating a transition gain control signal to thereby adjust said gain of said amplifying means to thereby cause said cathode beam current to start at a predetermined minimum level and subsequently, gradually increase to a predetermined normal level in a given period of time.

2. An automatic color temperature adjusting system as set forth in claim 1, wherein said transition control signal generator is active during a turn on transition period after the power supply is turned on for initially supplying said transition gain control signal at a predetermined maximum voltage level and gradually changing the voltage level of said transition gain control signal toward a predetermined operating voltage level within said turn on transition period.

3. An automatic color temperature adjusting system as set forth in claim 2, wherein after said cathode beam current reaches said predetermined normal level, the gain control signal generated by said feedback control means adjusts said gain of said amplifying means to vary said cathode beam current as a direct function of the emissions from said cathode.

4. An automatic color temperature adjusting system as set forth in claim 3, wherein said feedback controlling means includes an error signal generator means for comparing an input voltage which is representative of said cathode beam current, with a predetermined reference voltage to derive a difference therebetween and producing an error signal indicative of said difference.

5. An automatic color temperature adjusting system as set forth in claim 4, wherein said feedback controlling means further comprises a sample and hold circuit to sample and hold said error signal to produce said control voltage based on said held error signal level.

6. An automatic color temperature adjusting system as set forth in claim 5, wherein said sample and hold circuit operates during a white level blanking period to sample said error signals and holds said error signal level to output a constant control voltage upon termination of said white level blanking period.

7. An automatic color temperature adjusting system as set forth in claim 6, which further comprises means, active during said while level blanking period, for adding a predetermined white level reference signal to each of said primary color signals.

8. An automatic color temperature adjusting system as set forth in claim 6, wherein said transition control signal generator is connected to said sample and hold circuit to supply said transition gain control signal in order to initially raise the output of said sample and hold circuit to a maximum level in response to the turn on of the power supply and, subsequently, gradually decrease the level of said transition gain control signal to decrease said output level toward said operating voltage level within said turn on transition period.

9. An automatic temperature adjusting system as set forth in claim 8, wherein said transition control signal generator further includes a time constant circuit which provides a predetermined delay time for lowering the signal level of said transition gain control signal to a zero level after turning off of said power supply so that if the power is subsequently turned back on within the period of said delay time, said transition gain control signal is resumed at a level corresponding to the transition gain control signal level when said power was last turned off.

10. An automatic color temperature adjusting system as set forth in claim 4, wherein said transition control signal generator is connected to said error signal generator means to supply said transition gain control signal to the latter as said input voltage for adjusting said input voltage to a maximum level in response to the turn on of the power supply and, subsequently, gradually decreasing said input voltage level toward said operating voltage level within said turn on transition period.

11. An automatic color temperature adjusting system as set forth in claims 4 or 8, wherein said feedback controlling means generates the error signal as the gain control signal when the level of the error signal exceeds the predetermined operating voltage level.

12. An automatic color temperature adjusting system as set forth in claim 1, wherein the given periods of time, during which the respective feedback controlling means are adjusting the gains of the respective amplifying means, are different for each of the primary color signals.

13. An automatic color temperature adjusting system for a color television receiver having a color picture tube which includes a plurality of cathodes to be respectively driven by different corresponding color channel primary color signals, wherein the automatic color temperature adjusting system comprises:

means, including a plurality of primary color signal channels, for supplying respective channels of primary color signals to the corresponding cathodes in the picture tube;

means, disposed in each of the primary color signal channels, for amplifying the corresponding channel of the primary color signal at a controlled level; and means for feedback controlling the amplifying characteristics of each amplifying means so as to adjust the cathode beam current of the white level at an optimal level, the feedback controlling means being responsive to a turning on of the power supply to adjust the amplifying characteristics of the amplifying means to set the cathode beam current at a predetermined minimum level and subsequently, gradually increasing the cathode beam current to a normal level in a given period of time.

* * * * *